United States Patent [19]

Obayashi et al.

[11] 4,074,566
[45] Feb. 21, 1978

[54] INTAKE AIR AMOUNT DETECTING DEVICE FOR AN INTERNAL COMBUSTION ENGINE

[75] Inventors: Hideki Obayashi, Aichi; Tokio Kohama, Nishio; Tadashi Hattori; Minoru Nishida, both of Okazaki, all of Japan

[73] Assignee: Nippon Soken, Inc., Nishio, Japan

[21] Appl. No.: 735,885

[22] Filed: Oct. 26, 1976

[30] Foreign Application Priority Data

Nov. 1, 1975  Japan ............................... 50-131922

[51] Int. Cl.² ................................................ G01F 1/68
[52] U.S. Cl. ........................................... 73/116; 73/204
[58] Field of Search ............. 73/204, 116; 123/32 EA

[56] References Cited

U.S. PATENT DOCUMENTS

| | | | |
|---|---|---|---|
| 2,981,104 | 4/1961 | Auger et al. ....................... 73/204 X |
| 3,747,577 | 7/1973 | Mauch et al. ...................... 73/202 X |
| 3,975,951 | 8/1976 | Kohama et al. ...................... 73/116 |

*Primary Examiner*—Herbert Goldstein
*Attorney, Agent, or Firm*—Cushman, Darby & Cushman

[57] ABSTRACT

An intake air amount detecting device for an internal combustion engine has a temperature detector housing disposed in an intake pipe of the engine and defining first and second air passages in which first and second temperature detecting elements are disposed, respectively. An electric heater is disposed in the first air passage upstream of the first temperature detecting element. Sleeves of a resilient shock-absorbing material are interposed between the temperature detector housing and the electric heater and the first temperature detecting element and between the housing and the second temperature detecting element, respectively, whereby the heater and the temperature detecting elements are protected from shock, vibration and oscillation produced during operation of the engine and automobile on which the engine is mounted.

5 Claims, 6 Drawing Figures

INTAKE AIR AMOUNT DETECTING DEVICE FOR AN INTERNAL COMBUSTION ENGINE

BACKGROUND OF THE INVENTION

1. Field of the Invention

The present invention relates to an intake air amount detecting device for an internal combustion engine which is equipped with an electronically controlled fuel injection system.

2. Description of the Prior Art

To supply an internal combustion engine with an air-fuel mixture at a controlled, predetermined fixed air-fuel ratio is very effective to purify the engine exhaust gases. It is therefore necessary to accurately detect the amount of intake air into an internal combustion engine to determine a corresponding supply of a fuel to the engine.

The prior art intake air amount detecting system was so arranged as to indirectly detect a volumetric amount of intake air either on the basis of the engine speed and the intake vacuum or on the basis of the engine speed and the degree of the throttle valve opening. Thus, manufacturing tolerance of engine, deterioration of engine, improper adjustment of intake and exhaust valves and variation in the operation of air cleaner with the lapse of time greatly adversely affect the measurement of intake air amount with resultant large errors in the measured amount of intake air. In addition, the measurement of volumetric amount of intake air needs absolute pressure-based compensating calculation which makes the intake air detecting system complicated and expensive.

U.S. Pat. No. 3,975,951 issued Aug. 24, 1976 to Tokio Kahama et al discloses an improved intake air amount detecting system for an internal combustion engine which comprises a temperature detector housing disposed in an intake pipe of the internal combustion engine. The detector housing defines therein first and second air passages extending axially of the intake pipe. First and second temperature detecting elements are disposed in the air passages, respectively. An electric heater is disposed in the first air passage to heat the air flowing therethrough so that a temperature difference is produced between the flows of air through the first and second air passages. The temperature difference is detected by the first and second temperature detecting elements, while the voltage applied to the electric heater is controlled to adjust the heat generation of the heater so that the temperature difference is substantially constant. The controlling voltage is related to the amount by weight of intake air and thus is utilized as an electrical signal representative of intake air amount. The disclosure in the U.S. patent referred to is incorporated herein by reference.

The system disclosed in the U.S. patent is operable to accurately and directly measure the amount by weight of intake air flowing through an intake pipe of an associated internal combustion engine. From a practical point of view, however, the intake air detecting system is required to have a sufficient endurance to withstand not only the vibration and oscillation caused by the engine but also the vibration and oscillation produced during the operation of a vehicle on which the engine is mounted.

SUMMARY OF THE INVENTION

By providing shock-absorbing protective sleeves within air passages in a temperature detector housing of an intake air amount detecting system and supporting an electric heater and temperature detecting elements within the air passages by means of the protective sleeves, the present invention aims to advantageously prevent the electric heater and the temperature detecting elements from being damaged and/or broken due mainly to engine and vehicle body vibration and oscillation to thereby assure an accurate and reliable measurement of engine intake air amount.

The intake air amount detecting device according to the present invention comprises a temperature detector housing including a housing member of a heat-insulating material disposed within an intake pipe of an internal combustion engine and defining first and second through-holes substantially parallel to the axis of said intake pipe, first and second shock-absorbing sleeves of a shock-absorbing material having outer peripheral surfaces disposed in face-to-face contacting relationship with the inner peripheral surfaces of said first and second through-holes, respectively, at least one electric heater comprising heat generating wire means disposed within said first shock-absorbing protective sleeve, a first temperature detecting element disposed in said first shock-absorbing protective sleeve downstream of said electric heater, said first and second through-holes being substantially thermally insulated from each other, and a second temperature detecting element disposed in said second shock-absorbing protective sleeve.

Each of the shock-absorbing protective sleeves may have a substantially cylindrical inner peripheral surface for radially supporting either the electric heater and the first temperature detecting element or the second temperature detecting element alone. Alternatively, each shock-absorbing protective sleeve may be provided with annular flanges radially inwardly extending from the ends of the sleeve so that the intermediate portion of the sleeve cooperates with the flanges to define a radially inwardly open annular groove in which either the electric heater and the first temperature detecting element or the second temperature detecting element alone may be installed. In any case, the shock-absorbing protective sleeves are operative to effectively protect the electric heater and the first and second temperature detecting elements against shock, vibration and oscillation caused by the operation of an associated internal combustion engine and/or the operation of an automobile on which the engine is mounted. In addition, the shock-absorbing protective sleeves are effective to take up the difference in thermal expansion between the electric heater, first and second temperature detecting elements and the temperature detector housing.

The above and other objects, features and advantages of the present invention will be made apparent by the following description with reference to the accompanying drawings.

DESCRIPTION OF PREFERRED EMBODIMENTS

Figure 1:
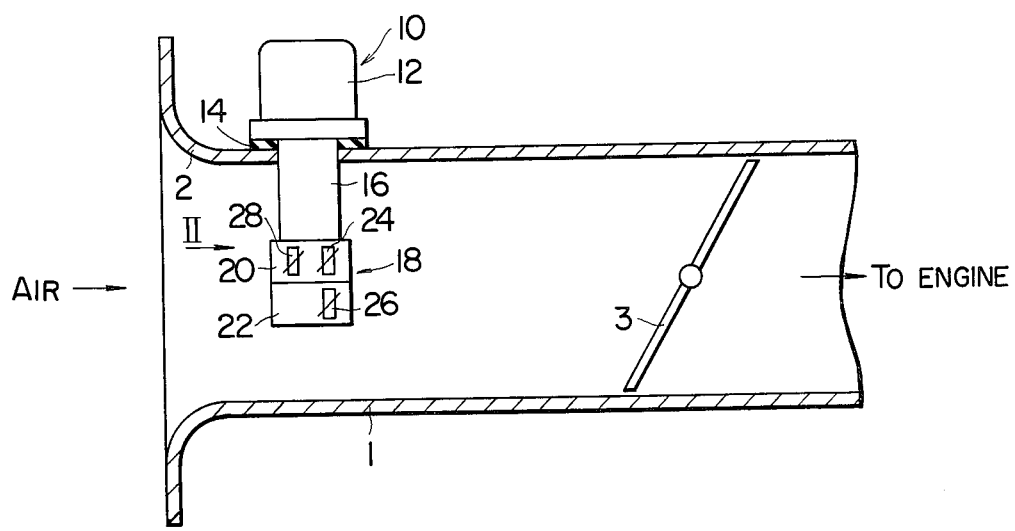
FIG. 1 is a partially schematic and partially diagrammatic illustration of an embodiment of an intake air amount detecting device according to the present invention.
Figure 2:
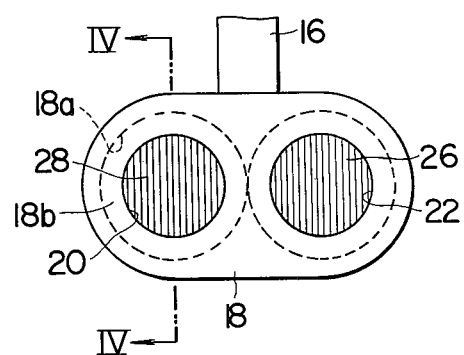
FIG. 2 is an enlarged front elevation of a temperature detector housing of the intake air amount detecting device as viewed from an arrow II in FIG. 1.

Referring to FIG. 1, reference numeral 1 designates an intake pipe of an internal combustion engine (not shown). The upstream end of the intake pipe 1 is formed into a bell-mounted, air-flow rectifier 2. A throttle valve 3 is operatively mounted in the intake pipe 1 between the air-flow rectifier 2 and an intake manifold (not shown) of the engine.

An intake air amount detecting device according to the present invention is generally designated by reference numeral 10 and mounted on the intake pipe 1 between the air-flow rectifier 2 and the throttle valve 3. The intake air amount detecting device 10 has a head or casing 12 accommodating electric circuits which are not shown but may be similar to those of the intake air amount detecting system disclosed in the U.S. patent referred to above. The casing 12 is mounted on the outer peripheral surface of the intake pipe 1 with a gasket 14 interposed therebetween. The gasket 14 is made from a soft and resilient material, such as rubber, so that the gasket is operative to absorb vibration of the intake pipe 1. A stem portion 16 is connected at one end to the casing 12 and extends through a lateral opening in the intake pipe 1 into the interior thereof. The other end of the stem portion 16 is connected to a temperature detector housing 18 which is disposed within the intake pipe 1 substantially centrally of the cross-sectional area thereof. The temperature detector housing 18 is made from a heat-insulating material, such as glass-wool, and defines therein first and second air passages 20 and 22 extending substantially parallel with the axis of the intake pipe 1, as diagrammatically shown in FIG. 1. The housing 18 may be reinforced by a covering (not shown) of a cast metal, such as aluminum or aluminum alloy, which extends over the outer surface of the housing 18. First and second temperature detecting elements 24 and 26 both of the same temperature-resistance characteristics are disposed respectively in the first and second air passages 20 and 22 adjacent the downstream ends thereof. In the illustrated embodiment of the invention, the temperature detecting elements 24 and 26 include resistors made of strands of platinum wire which has a positive temperature-resistance coefficient. An electric heater 28 is disposed in the first air passage 20 upstream of the first temperature detecting element 24. The heater 28 includes a resistor which comprises a platinum wire in the embodiment of the invention.

Figure 3A:
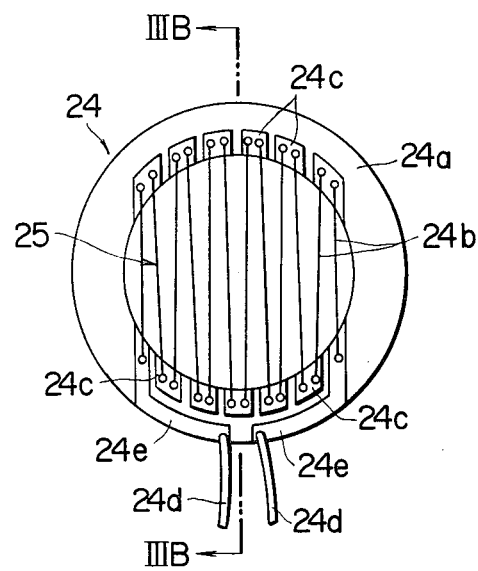
FIG. 3A is an enlarged plan view of one of temperature detecting elements shown in FIG. 1.
Figure 3B:
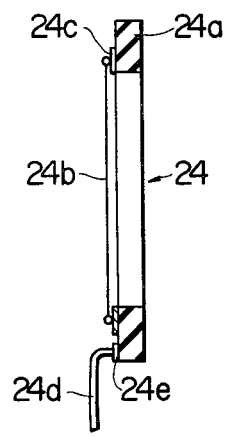
FIG. 3B is an axial sectional view of the temperature detecting element shown in FIG. 3A as taken along line IIIB—IIIB in FIG. 3A.

Referring to FIGS. 3A and 3B, the temperature detecting element 24 comprises an annular base 24a of an electrically insulating material, such as a glass-based epoxy resin, a paper-based epoxy resin or ceramic material, and a plurality of strands of platinum resistor wire 24b extending in a grid pattern across the entire cross-section of an opening defined by the inner peripheral surface of the annular base 24a. The wire strands 24b are connected in series by pieces 24c of a metal, such as copper, silver or gold, secured to one surface of the annular base 24a. The series-connected wire strands form an electric resistor 25 across which a voltage is applied from a power source (not shown) through conductors 24d which are connected to terminals 24e of the resistor 25, respectively.

The other temperature detecting element 26 and the electric heater 28 are similar in structure to the temperature detecting element 24 and thus will not be described herein.

Figure 4:
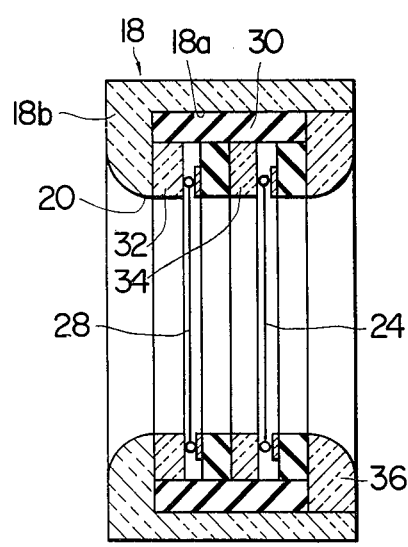
FIG. 4 is an enlarged axial sectional view of the temperature detector housing shown in FIG. 2 as taken along line IV—IV in FIG. 2.

Referring to FIG. 4, the temperature detector housing 18 defines therein two substantially cylindrical parallel bores one of which is shown and designated by reference numeral 18a. An annular flange 18b extends radially inwardly from the upstream end of the bore 18a. A shock-absorbing protective sleeve 30 of a resilient shock-absorbing material, such as rubber or a soft plastic material, is snugly received in the bore 18a. The electric heater 28 and the temperature detecting element 24 are snugly mounted in the shock-absorbing protective sleeve 30. Spacer rings 32 and 34 of a material the same as that of the housing 18 are interposed between the flange 18b and the heater 28 and between the heater 28 and the temperature detecting element 24, respectively. A retainer ring 36 of a material the same as that of the housing is fitted into the downstream end of the bore 18b and placed in abutment engagement with the end faces of the protective sleeve 30 and the temperature detecting element 24. The inner peripheral surfaces of the flange 18b, the annular bases of the electric heater 28 and of the temperature detecting element 24 and the rings 32, 34 and 36 cooperate together to define the above-mentioned air passage 20.

Details of other air passage 22 in the temperature detector housing 18 are not shown but it will be sufficient to make a reference that the air passage 22 is substantially similar in structure to the air passage 20 with the exception that the air passage 22 contains the second temperature detecting element 26 in place of the first temperature element 24 and that no electric heater is disposed in the second air passage 22.

In operation, an amount of air which is determined by the degree of opening of the throttle valve 3 flows from an air cleaner (not shown) and through the intake pipe 1 into the engine (not shown). Because the air flow is rectified by the air-flow rectifier 2 provided at the upstream end of the intake pipe 1, a substantially fixed, certain percentage of the flow of the intake air through the intake pipe 1 into the engine flows through the air passages 20 and 22 defined in the temperature detector housing 18. The air flow through the first air passage 20 is heated by the electric heater 28 so that the temperature of the air is increased by $\Delta T$ degrees. The heated air then flows through the temperature detecting element 24. On the other hand, the other air flow through the second air passage 22 is not heated and merely flows through the second temperature detecting element 26. The temperature difference of $\Delta T$ degrees between the flows of air through the first and second air passages 20 and 22 is related to the amount of the intake air and is detected by the cooperation of the first and second temperature detecting elements 24 and 26. The temperature difference is detected as a difference in voltage between the resistors of the first and second temperature detecting elements 24 and 26.

The temperature difference $\Delta T$ varies with the variation in the amount of intake air. Thus, the voltage applied to the electric heater 28 is controlled by control circuits (which are not shown but may be similar to those disclosed in U.S. Pat. No. 3,975,951) such that the temperature difference ΔT is substantially constant. The voltage used to control the electric heater 28 is therefore related to the amount of intake air and thus can be utilized as an electric signal which is related to the intake air amount.

It is to be noted that the resilient, shock-absorbing protective sleeve 30 advantageously protects the first temperature detecting element 24 and the electric heater 28 against shock, vibration and oscillation produced during operation of an associated internal combustion engine and an automobile on which the engine is mounted. The second temperature detecting element 26 is similarly protected by a second shock-absorbing protective sleeve (not shown) which is provided in the second air passage 22. Thus, the fine wire strands which form resistors of the temperature detecting elements 24 and 26 and the electric heater 28 are advantageously prevented from otherwise being easily broken or damaged by shock and/or vibration. In addition, the protective sleeves are effective to thermally insulate the two air passages 20 and 22 from each other and prevent escape of the heat produced by the heater 28 with a result that the accuracy of the measurement of the amount of intake air is improved. The protective sleeves are also effective to take up the difference in thermal expansion between the temperature detecting housing 18 and the annular bases of the temperature detecting elements 24 and 26 and the electric heater 28. Accordingly, the intake air amount detecting device according to the present invention is given a prolonged operative life and can perform an accurate and reliable operation.

Figure 5:
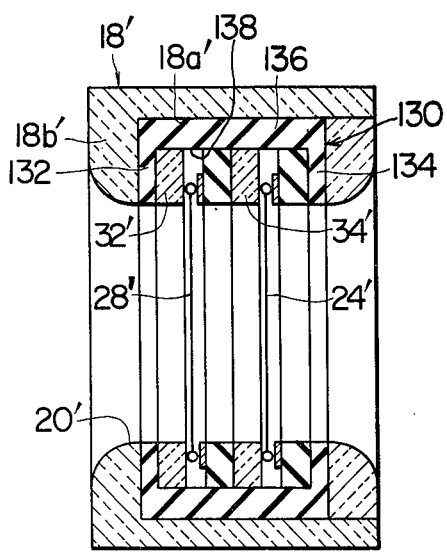
FIG. 5 is a view similar to FIG. 4 but illustrating a second embodiment of the invention.

FIG. 5 illustrates in section a temperature detector housing 18' of a second embodiment of the invention. The parts and elements which are similar to those of the preceeding embodiment of the invention are designated by similar reference numerals added with a prime ('). The difference resides in a feature that a shock-absorbing protective sleeve 130 of a resilient shock-absorbing material, such as one mentioned previously, has flanges 132 and 134 extending radially inwardly from the opposite ends of the sleeve to a first air passage 20'. The flanges 132 and 134 cooperate with an intermediate cylindrical portion 136 of the protective sleeve 130 to define a radially inwardly opened annular groove 138 in which is snugly received a stack or assembly of a first spacer ring 32', an electric heater 28', a second spacer ring 34' and a first temperature detecting element 24'. As shown in the drawing, the assembly of these elements is supported radially and axially of the temperature detector housing 18' by the shock-absorbing protective sleeve 130. Thus, in addition to the advantages of the shock-absorbing protective sleeve 30 of the first embodiment, the sleeve 130 of the second embodiment provides a further advantage that the first temperature detecting element 24' and the electric heater 28' are prevented also from the axial shock, vibration and oscillation.

The temperature detector housing 18' further defines therein a second air passage (not shown) which is similar in structure to the first air passage 20' with the exception that a second temperature detecting element (not shown) similar to the first one 24' is provided in the second air passage and that no electric heater is provided in the second air passage.

What is claimed is:

1. An intake air amount detecting device for an internal combustion engine, comprising:
    a temperature detector housing including a housing member of a heat-insulating material disposed within an intake pipe of an internal combustion engine and defining first and second through-holes substantially parallel to the axis of said intake pipe;
    first and second shock-absorbing sleeves of a shock-absorbing material having outer faces disposed in face-to-face contacting relationship with the inner surfaces of said first and second through-holes, respectively;
    at least one electric heater supported by said shock-absorbing sleeve and including heat generating wire means disposed within said first shock-absorbing protective sleeve;
    a first temperature detecting element supported and disposed within said first shock-absorbing protective sleeve downstream of said electric heater;
    said first and second through-holes being substantially thermally insulated from each other; and
    a second temperature detecting element supported by and disposed in said second shock-absorbing protective sleeve.

2. An intake air amount detecting device according to claim 1, in which said intake pipe has means provided at the upstream end of said intake pipe for collecting air into a collimated air flow.

3. An intake air amount detecting device for an internal combustion engine, comprising:
    a temperature detector housing including a housing member of a heat-insulating material disposed within an intake pipe of an internal combustion engine and defining first and second through-holes substantially parallel to the axis of said intake pipe;
    first and second shock-absorbing protective sleeves of a shock-absorbing material having outer faces disposed in face-to-face contacting relationship with the inner surfaces of said first and second through-holes, respectively;
    an electric heater including a base of an electrically insulating material supported by and disposed within said first shock-absorbing protective sleeve and defining a first opening substantially co-axial with said first sleeve, said electric heater also including heat generating resistor wire means extending in a grid pattern across the cross-sectional area of said first opening;
    a first temperature detecting element including a base of an electrically insulating material supported by and disposed within said first shock-absorbing protective sleeve downstream of said electric heater and defining a second opening disposed in substantially co-axial and fluid-flow communication with said first opening, said first temperature detecting element also including electrically resistive wire means extending in a grid pattern across the cross-sectional area of said second opening; and
    a second temperature detecting element including a base of an electrically insulating material supported by and disposed within said second shock-absorbing protective sleeve and defining a third opening substantially co-axial with said second sleeve, said second temperature detecting element also including electrically resistive wire means extending in a grid pattern across the cross-sectional area of said third opening.

4. An intake air amount detecting device for an internal combustion engine, comprising:
- a temperature detector housing including a housing member of a heat-insulating material disposed within an intake pipe of an internal combustion engine and defining first and second through-holes substantially co-axial to the axis of said intake pipe;
- first and second shock-absorbing protective sleeves having outer faces disposed in face-to-face contacting relationship with the inner surfaces of said first and second through-holes, respectively, each sleeve being formed with a radially inwardly opened groove;
- an electric heater including a base of an electrically insulating material disposed in the groove in said first shock-absorbing protective sleeve and supported thereby and defining a first opening substantially co-axial with said first sleeve, said electric heater also including heat generating resistor wire means extending in a grid pattern across the cross-sectional area of said first opening;
- a first temperature detecting element including a base of an electrically insulating material disposed in the groove in said first shock-absorbing protective sleeve downstream of said electric heater and supported by said first sleeve and defining a second opening disposed in substantially co-axial and fluid-flow communication with said first opening, said first temperature detecting element also including electrically resistive wire means extending in a grid pattern across the cross-sectional area of said second opening; and
- a second temperature detecting element including a base of an electrically insulating material disposed in the groove in said second shock-absorbing protective sleeve and supported thereby and defining a third opening substantially co-axial with said second sleeve, said second temperature detecting element also including electrically resistive wire means extending in a grid pattern across the cross-sectional area of said third opening.

5. An intake air amount detecting device according to claim 4, in which each of said first and second shock-absorbing protective sleeves is provided with flanges extending radially inwardly from the opposite ends thereof to define said groove therebetween.

* * * * *